United States Patent
Saeki et al.

(10) Patent No.: US 7,338,627 B2
(45) Date of Patent: Mar. 4, 2008

(54) INJECTION MOLDING METHOD AND INJECTION MOLDING APPARATUS

(75) Inventors: Toshi Saeki, Okazaki (JP); Makoto Suzuki, Okazaki (JP); Katsumasa Isogai, Okazaki (JP); Kazuhiro Hanai, Okazaki (JP); Syuuichi Hazama, Okazaki (JP)

(73) Assignee: Daiwa Kasei Industry Co., Ltd., Aichi (JP)

( * ) Notice: Subject to any disclaimer, the term of this patent is extended or adjusted under 35 U.S.C. 154(b) by 362 days.

(21) Appl. No.: 10/632,844

(22) Filed: Aug. 4, 2003

(65) Prior Publication Data
US 2005/0012243 A1    Jan. 20, 2005

(30) Foreign Application Priority Data
Jul. 14, 2003   (JP) .............................. 2003-196425

(51) Int. Cl.
*B29C 45/07* (2006.01)
(52) U.S. Cl. .............................. 264/328.8; 264/328.12; 264/328.11; 425/574; 425/573
(58) Field of Classification Search .............. 264/328.8
See application file for complete search history.

(56) References Cited

U.S. PATENT DOCUMENTS

| | | | | |
|---|---|---|---|---|
| 3,448,490 A | * | 6/1969 | Ryck .......................... | 425/119 |
| 3,464,091 A | * | 9/1969 | Bielfeldt ..................... | 425/574 |
| 4,124,343 A | * | 11/1978 | Makinson et al. .......... | 425/145 |
| 5,040,969 A | * | 8/1991 | von Buren et al. ......... | 425/572 |
| 5,407,342 A | | 4/1995 | Boucher et al. | |
| 5,762,855 A | * | 6/1998 | Betters et al. ........... | 264/328.8 |
| 6,245,415 B1 | | 6/2001 | Keller et al. | |

FOREIGN PATENT DOCUMENTS

| EP | 0 630 731 A1 | 6/1994 |
|---|---|---|
| EP | 0 630 731 A1 | 12/1994 |

(Continued)

OTHER PUBLICATIONS

Abstract of JP2000094491, Publication Date Apr. 4, 2000.

(Continued)

*Primary Examiner*—Monica A Huson
(74) *Attorney, Agent, or Firm*—Townsend & Banta

(57) ABSTRACT

The present invention provides an injection molding method which intends to lower a mold clamping force in view of both of a projected area of a molded article and an injection pressure, and contributes to an energy saving and a reduction in a cost of equipment and a manufacturing cost. In a cavity (13) formed in a metal mold (5) for an injection molding, there are arranged a first gate (21) injecting a first molten resin (101) anteceding in one end side (a charging start side) in a longitudinal direction, and a second gate (22) injecting a second molten resin (102) following in another end side (a charging finish side). The second molten resin (102) is newly injected from the second gate (22) before a fluid head portion of the first molten resin (101) injected from the first gate (21) reaches a position of the second gate (22). Further, the first molten resin (101) becomes in an approximately cooled and solidified state by the time when the second molten resin (102) reaches a terminal end in the charging finish side within the cavity (13).

3 Claims, 11 Drawing Sheets

FOREIGN PATENT DOCUMENTS

| | | |
|---|---|---|
| GB | 2 268 700 A | 1/1994 |
| JP | 3288609 | 12/1991 |
| JP | 6344398 | 12/1994 |
| JP | 8156033 | 6/1996 |
| JP | 2000094491 | 4/2000 |
| JP | 2001179786 | 7/2001 |

OTHER PUBLICATIONS

Abstract of JP6344398, Publication Date Dec. 20, 1994.
Abstract of JP3288609, Publication Date Dec. 18, 1991.
Abstract, JP2001179786, Publication Date Jul. 3, 2001.
Abstract of JP8156033, Publication Date Jun. 18, 1996.
Patent Abstracts of Japan, vol. 2003, No. 04, Apr. 2, 2003 & JP 2002 355866A (Daiwa Kasei Ind. Co., Ltd), Dec. 10, 2002 & Abstract.
Patent Abstract of Japan, vol. 2000, No. 01, Jan. 31, 2000 & JP 11 291297 A (Nissan Motor Co. Ltd.), Oct. 26, 1999 & Abstract.
Gauler K: "Bindenaehte Von Spritzgiessteilen Beseitigen", Plastverarbeiter, Zechner Und Huethig Verlag GMBH, Speyer/Rhein, De, vol. 37, No. 10, Oct. 1, 1986 pp. 226-228, XP002069379, ISSN: 0032-1338.
Homes W: "Kaskadenspritzgiessen Vermeidet Bindenaehte", Kunststoffe, Carl Hanser Verlag, Munchen, DE, vol. 86, No. 9, Sep. 1, 1996, p. 1263, 1270, 1272, XP000627890, ISSN: 0023-5563.
"New Concept In Runnerless Valve Gating Slashes 55% Molded-Component Reject Rate By Two-Thirds", Modern Plastics International, McGraw-Hill, Inc., Lausanne, Ch, vol. 13, No. 8, Aug. 1983, p. 80, XP001176392, ISSN: 0026-8283.
Patent Abstracts of Japan, vol. 006, No. 076, May 13, 1982 & JP 57 015940 A (Ricoh Co., Ltd), Jan. 27, 1982 & Abstract.
JP 2002355866, dated Aug. 5, 2002, and English Abstract thereof.

\* cited by examiner (a)

(b)

(a)

(b)

INJECTION MOLDING METHOD AND INJECTION MOLDING APPARATUS

BACKGROUND OF THE INVENTION

1. Field of the Invention

The present invention relates to an injection molding method and injection molding apparatus particularly suitable for an elongated molded article, such as a resin part for a motor vehicle or the like.

2. Description of Related Art

An elongated resin product, for example, a protector for a wiring harness of the motor vehicle is generally manufactured by an injection molding machine. The injection molding machine has an injection unit for melting a resin material so as to inject, and a mold clamping unit for clamping a metal mold by a high pressure, and a capacity thereof is frequently expressed by a "mold clamping force." The "mold clamping force" is expressed by a product of "projected area of a molded article in a surface perpendicular to a moving direction of the metal mold" and "average resin pressure within the metal mold." The greater a value (expressed by ton) of the mold clamping force is, the larger the apparatus is. A cost of equipment is increased accordingly. For example, about 200 tons of mold clamping force is required even in an elongated resin product having a length of about some tens cm, it is desired to make the equipment compact by reducing the mold clamping force.

In order to reduce the mold clamping force, there has been employed mainly a method of making an injection pressure low (as a result, the average resin pressure within the metal mold becomes low). As the low pressure molding method mentioned above, there have been known a method of injecting a molten resin into a cavity of the metal mold under a half-open state and clamping the mold before solidification, a method of previously injecting a predetermined amount of molten resin into the cavity, intruding the molten resin charged in another sub chamber (a resin reservoir) into the cavity, and clamping the mold before solidification, and the like.

However, in these low pressure molding methods, since there still exists a need of making the molten resin to go around all over within the cavity, it is impossible to sufficiently lower the injection pressure (by extension, the average resin pressure within the metal mold), and there is a limit in lowering the mold clamping force.

SUMMARY OF THE INVENTION

An object of the present invention is to provide an injection molding method which intends to lower a mold clamping force in view of both of a projected area of a molded article and an injection pressure, and contributes to an energy saving and a reduction in a cost of equipment and a manufacturing cost.

In order to achieve the object mentioned above, in accordance with the present invention, there is provided an injection molding method, wherein one end side in a longitudinal direction of a cavity formed in a metal mold for an injection molding is set to a charging start side of a molten resin, another end side thereof is set to a charging finish side, and a plurality of gates for injecting said molten resin into the cavity are arranged from the charging start side toward the charging finish side, and wherein said molten resin is sequentially injected into said cavity by a predetermined time difference from starting the injection in the gate in said charging start side.

In accordance with the present invention, by the time when the molten resin injected from the final gate among a plurality of gates reaches the terminal end in the charging finish side (that is, the charging within the cavity is finished), the molten resin injected from the other gates can approximately achieve a cooled and solidified state.

Accordingly, a substantial projected area to be filled by the molten resin injected from the final gate becomes significantly smaller than a total projected area of the cavity (the projected area corresponding to the already cooled and solidified portion is reduced). On the other hand, since the area to be filled by the molten resin injected from the final gate is reduced at an amount corresponding to the already cooled and solidified portion within the cavity, it is not necessary to make the molten resin to go around all over within the cavity, and an injection pressure (by extension, an average resin pressure within the metal mold) can be lowered in correspondence thereto. Therefore, since it is possible to make the substantial projected area of the molded article small at a time of injecting the molten resin from the final gate corresponding to the time of determining the maximum mold clamping force, and it is also possible to lower the injection pressure, it is possible to intend to lower the mold clamping force in view of both of the projected area of the molded article and the injection pressure.

Further, the injection molding method in accordance with the present invention may be applied to a metal mold for an injection molding having two gates. In this case, in order to achieve the object mentioned above, there is provided an injection molding method, wherein one end side in a longitudinal direction of a cavity formed in a metal mold for an injection molding is set to a charging start side of a molten resin, another end side thereof is set to a charging finish side, and a first gate and a second gate are respectively arranged in said charging start side and the charging finish side, wherein a second molten resin is newly injected from the second gate before a fluid head portion of the first molten resin injected from said first gate reaches a position of said second gate, and wherein said first molten resin becomes an approximately cooled and solidified state by the time when the second molten resin reaches said charging finish side terminal end within said cavity.

In this case, a substantial projected area to be filled by the second molten resin injected from the second gate is reduced at a projected area of a portion in which the first molten resin injected from the first gate has been already cooled and solidified within the cavity, and can be reduced, for example, to about one third the total projected area of the cavity. On the other hand, the range to be filled by the second molten resin is reduced at an amount corresponding to the portion in which the first molten resin has been already cooled and solidified within the cavity as mentioned above, and the injection pressure can be lowered in correspondence thereto. As mentioned above, it is possible to intend to widely lower the mold clamping force in view of both of the projected area of the molded article and the injection pressure.

In accordance with the present invention, there is provided an injection molding method, wherein one end side in a longitudinal direction of a cavity formed in a metal mold for an injection molding is set to a charging start side of a molten resin, another end side thereof is set to a charging finish side, and a first gate in the charging start side and a second gate in the charging finish side for injecting said molten resin into the cavity are arranged, wherein the resin is first injected into the cavity from the first gate, the resin is next injected into the cavity from the second gate, and a time difference is provided between injection timings of the first gate and the second gate in such a manner that the molten resin injected from the first gate becomes in an approximately cooled and solidified state by the time when the molten resin injected from the second gate reaches the cavity end in the charging finish side, and wherein a fluid head portion of an anteceding molten resin injected from the first gate is set not to reach a position of the second gate, a projected area of the resin injected from the first gate is made larger than a projected area of the resin injected from the second gate, a cavity portion which is not filled by the resin injected from the first gate is filled by the resin injected from the second gate having the smaller projected area than the projected area of the resin injected from the first gate, and a difference in projected area is provided between the injection resins of the first and second gates so that the projected area of the injection resin from the second gate is about one third or less of the total projected area of the entire cavity, whereby the entire of the cavity is finally filled by the resin.

Further, in accordance with the present invention, the injection molding method can be structured such that the metal mold for injection molding is divided into a stationary mold and a movable mold, a core portion is formed in a protruding shape in a center of the movable mold, and an elongated cavity is formed in said stationary mold in correspondence to the core portion, a mold clamping state is established by fitting the core portion to the cavity, and the molten resin is thereafter injected from the first gate and the second gate with a time difference.

Furthermore, in accordance with the present invention, there is provided an injection molding method, wherein an injection portion moving along a line of a plurality of resin supplying ports for supplying a molten resin to a cavity injects the molten resin from the resin supplying port and thereafter moves to the next resin supplying port so as to inject, thereby injecting to all the resin supplying ports.

A plurality of resin supplying ports for injecting a molten resin into a cavity formed in a metal mold for an injection molding are provided, one end in a longitudinal direction of the cavity is set to a charging start side, another end thereof is set to a charging finish side, the charging of the molten resin is started from the resin supplying port in the charging start side, the molten resin is next charged from the second resin supplying port, and the molten resin is sequentially charged from the third and fourth resin supplying ports, whereby an entire of the cavity is filled by the resin.

The injection portion moves along the line of the resin supplying ports provided for injecting the molten resin into the elongated cavity, whereby it is possible to supply the molten resin from each of the resin supplying ports. Since the injection portion moves and injects, it is not necessary to place a plurality of injection portions, and it is possible to make the apparatus compact. Further, since a plurality of resin supplying ports are provided, the substantial projected area to be filled by the injected resin injected from the final resin supplying port can be widely reduced by the cooling and solidification of the resin injected from the other resin supplying ports, and the injection pressure can be made low. Accordingly, it is possible to intend to lower the mold clamping force in view of both of the projected area of the molded article and the injection pressure.

In accordance with one aspect of the injection molding method of the present invention, the injection portion moves to the upper resin supplying ports from the lower end resin supplying port in a plurality of resin supplying ports arranged in a vertical direction, and injects the molten resin into the cavity. The resin is first injected from the lower end resin supplying port in a plurality of resin supplying ports provided in the vertical direction, and the injection portion next moves to one upper resin supplying port, and injects the resin from this port. Since the resin drops to a lower end of the cavity due to its own weight, it is possible to fill the cavity from the lower end of the cavity without no gap.

Further, in accordance with the present invention, there is provided an injection molding method, wherein the injection of the molten resin from the injection portion to one resin supplying port is finished by a detection sensor provided in a predetermined position of the cavity for detecting a charging amount of the molten resin, and the injection portion moves to the other resin supplying ports. It is possible to detect the charging amount of the resin within the cavity by the detection sensor. Accordingly, the injection portion stops the injection from a certain resin supplying port and moves to the next resin supplying port.

Further, in accordance with the present invention, there is provided an injection molding method, wherein before the injection of the molten resin from one resin supplying port is finished by the injection portion and the molten resin is solidified, the resin is injected from the next resin supplying port. The injected resin starts solidifying by the time when the molten resin is injected into the cavity and the injection is started from the next resin supplying port. Since the resin injected from the next resin supplying port has a high temperature, the resin beginning to solidify within the cavity is molten a little by the injection of the hot resin into the cavity. The resin beginning to solidify and the hot resin are mixed so as to be cooled and solidified, whereby these resins can be bonded. As a result, it is possible to lower the injection pressure and the mold clamping force.

In accordance with the present invention, there is provided an injection molding apparatus comprising:
 an elongated cavity formed in a metal mold for an injection molding;
 a plurality of resin supplying ports arranged in a longitudinal direction of the cavity and provided for injecting a resin to the cavity;
 an injection portion provided so as to freely move along a direction of arrangement of the resin supplying ports; and
 an injection portion driving apparatus sequentially moving said injection portion to a position in correspondence to the resin supplying port.

Since a plurality of resin supplying ports are provided in the elongated cavity, the resin can be injected from each of the resin supplying ports. Since the injection portion movable along the arrangement direction of the resin supplying ports is moved by the injection portion driving apparatus, the resin can be sequentially injected from each of the resin supplying ports.

An extrusion and injection screw can move to each of a plurality of resin supplying ports, on the basis of the movement of the injection portion and the injection mechanism. A nozzle in a leading end of the extrusion and injection screw corresponding to the injection mechanism placed in the injection portion is brought into contact with the resin supplying ports (nozzle touch) by an air cylinder corresponding to the injection mechanism driving apparatus, whereby the molten resin is injected into the cavity from the resin supplying ports. In accordance with the structure mentioned above, it is possible to inject the molten resin from each of a plurality of resin supplying ports placed in the cavity.

After the charging of the molten resin from the first resin supplying port in the charging start side is finished, the injection port is moved above the second resin supplying port together by the injection portion driving apparatus, and the charging of the molten resin from the second resin supplying port is started. The injection portion moves along the longitudinal direction of the cavity, that is, the arrangement direction of the resin supplying ports, and can move above all the resin supplying ports. The entire of the cavity can be filled by the resin by applying the operations mentioned above to all the resin supplying ports. The resin is injected to the final resin supplying port by a predetermined injection pressure, whereby the molded shape is completed.

In accordance with one aspect of the present invention, there is provided an injection molding apparatus, wherein one end and another end of the elongated cavity are positioned apart from each other in a vertical direction, and the injection portion moves between one end side and another end side of the cavity. In the case that the structure is made such that the longitudinal direction of the cavity is set to an approximately vertical direction, and the resin is injected from the lower end resin supplying port, the resin can be charged from the lower end of the cavity due to its own weight. Accordingly, it is possible to fill the cavity by the resin without any gap.

Further, in accordance with the present invention, there is provided an injection molding apparatus provided with a detection sensor for detecting a charging amount of the molten resin in a predetermined position of the cavity. Since the detection sensor is provided in the predetermined position of the cavity, it is possible to detect the charging amount of the resin injected into the cavity. It is possible to stop the injection and move to the next resin supplying port on the basis of a signal from the detection sensor.

Further, in accordance with the present invention, there is provided an injection molding apparatus including a hot runner with a shutoff function for preventing the molten resin from flowing out. When the extrusion screw of the injection mechanism moves apart from the resin supplying port after finishing the injection from the resin supplying port, the resin which is not solidified flows out from the cavity. It is possible to prevent the molten resin from flowing out by applying the shutoff function to the hot runner.

In accordance with the present invention, there is provided an injection molding apparatus comprising:

an elongated cavity formed in a metal mold for an injection molding;

a plurality of resin supplying ports arranged in a longitudinal direction of said cavity and provided for injecting a resin to the cavity;

an injection portion provided so as to freely move along a direction of arrangement of the resin supplying ports; and an injection portion driving apparatus sequentially moving the injection portion to a position in correspondence to the resin supplying port, wherein the molten resin is injected from each of the resin supplying ports while feeding a gas into the cavity so as to pressurize the cavity at a time of injecting the resin from each of the resin supplying ports, the gas pressurization is finished just before the resin is injected from the final resin supplying port, the resin is injected from the final resin supplying port, and the charging is finished.

It is possible to fill the gap of the resin by feeding the gas into the cavity so as to pressurize the cavity by the gas, whereby it is possible to charge the molten resin from the terminal end of the cavity with no gap.

In accordance with one aspect of the injection molding apparatus of the type pressurizing by the gas, the structure can be made such that the elongated cavity is formed so that one end and another end thereof are positioned apart from each other by a predetermined amount in a horizontal direction. In the case that the cavity is elongated in the horizontal direction or the approximately horizontal direction, there is a case that the resin is hard to be charged into the cavity with no gap due to its own weight of the resin. Accordingly, the resin can be charged into the cavity with no gap by pressurizing the cavity by the gas.

In accordance with the present invention, there is provided an injection molding method, wherein a plurality of resin supplying ports are provided in an elongated cavity in which one end and another end are positioned apart from each other in a vertical direction, stationary injection mechanisms of the same number as the resin supplying ports are placed in the resin supplying ports, a molten resin injection is begun from the injection mechanism positioned in a lower end in a longitudinal direction of the cavity, the molten resin is sequentially injected from the upper injection mechanisms, and the charging of the cavity is finished by injecting from the uppermost injection mechanism.

Since the injection portions are placed with respect to the respective resin supplying ports, a time can be saved in comparison with the case that one injection portion moves as mentioned above. The resin is charged from the lower end within the cavity by beginning the injection from the lower end injection portion, whereby it is possible to lower the injection pressure and the mold clamping force.

As an effect of the present invention that a plurality of resin supplying ports are provided and the molten resin is injected from the resin supplying ports in a plurality of divided times, it is possible to lower the mold clamping force to about 10 tons, the mold clamping force between 300 tons and 350 tons being conventionally required for the elongated product having the length of some tens cm. In the case of manufacturing the longer product, the larger equipment is required in accordance with the conventional method, however, in the present machine, the injection is performed in a divisional manner by increasing the number of the resin supplying ports, so that there can be obtained an advantage that the mold clamping force of about 10 tons is sufficient for some conditions. In accordance with the molding method, it is possible to intend to lower the mold clamping force, and it is possible to intend to reduce the cost of equipment and the manufacturing cost. Further, it is possible to intend to lower the injection pressure.

DESCRIPTION OF THE PREFERRED EMBODIMENT

Figure 1:
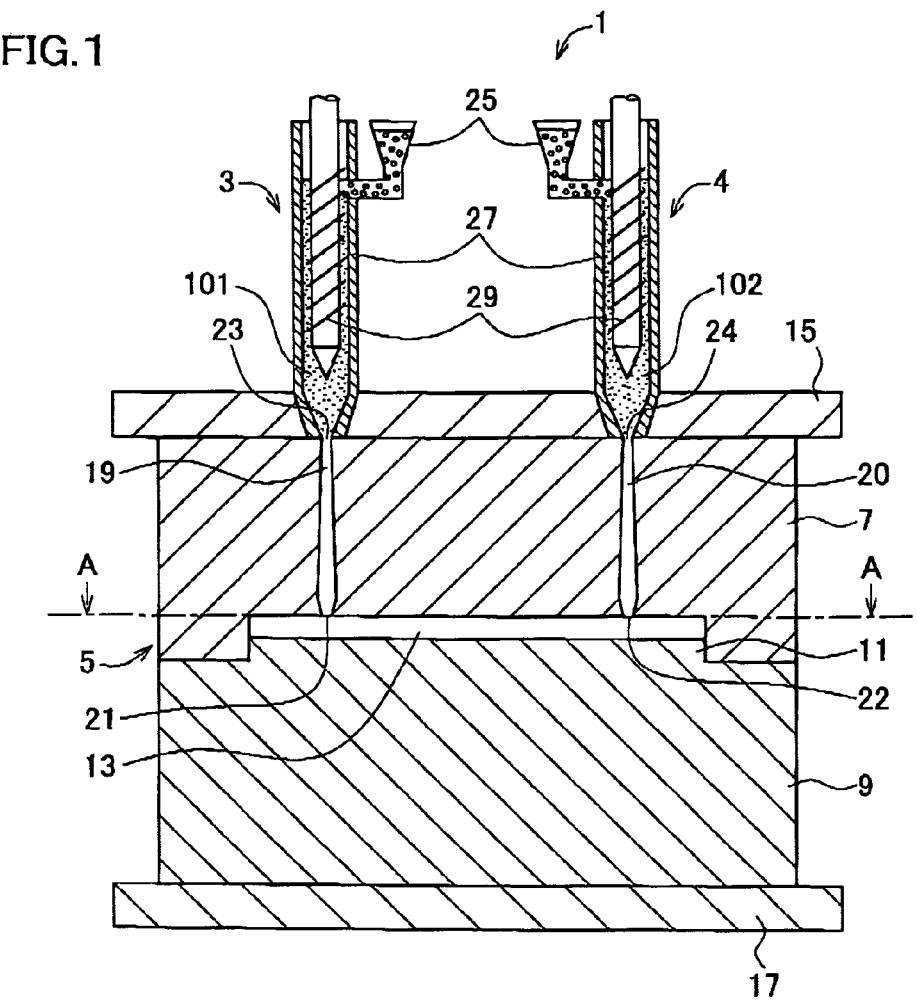
FIG. 1 is a cross sectional view showing an embodiment of an injection molding machine used in the present invention.

Next, a description will be given of an embodiment in accordance with the present invention with reference to the accompanying drawings. FIG. 1 is a cross sectional view showing an embodiment of an injection molding machine used in the present invention. The injection molding machine 1 is structured such as to manufacture a molded article of a resin part for a motor vehicle or the like (for example, an elongated part such as a protector for a wiring harness of the motor vehicle) by using a metal mold 5 for an injection molding (hereinafter, refer simply to a metal mold). The injection molding machine 1 is provided with an injection unit 3 melting a molding material such as a synthetic resin or the like so as to inject into the metal mold 5, and a mold clamping unit (not shown) opening or closing the metal mold 5 and clamping and fixing the metal mold 5 by a high pressure.

The metal mold 5 is divided into a stationary mold 7 positioned in an upper side in the drawing and a movable mold 9 positioned in a lower side thereof. A core portion 11 (a male mold) is formed in a protruding shape in a center of the movable mold 9, and a cavity 13 (a female mold) corresponding to a space charged by a molten resin in correspondence to the core portion 11 is formed in the stationary mold 7. Further, the stationary mold 7 is mounted to a stationary side die plate 15 positioned above the stationary mold 7, and the movable mold 9 is mounted to a movable side die plate 17 positioned below the movable mold 9. The movable side die plate 17 can be moved close to and apart from the stationary side die plate 15 in a vertical direction, thereby being connected to a mold clamping unit (not shown) which can open and close the metal mold 5.

On an upper surface of the cavity 13 formed in an elongate shape in a lateral direction in FIG. 1, there are formed a first gate 21 which is open to a charging start side set in one end side in a longitudinal direction (a lateral direction), and a second gate 22 which is open to a charging finish side set in another end side. Further, the first gate 21 is communicated and connected with a first nozzle 23 in a leading end of the first injection unit 3 via a sprue 19 provided so as to extend through an inner portion of the stationary mold 7 in a vertical direction, and is also communicated and connected with a second nozzle 24 in a leading end of the second injection unit 4 via a sprue 20, respectively.

In this case, each of the first injection unit 3 and the second injection unit 4 has a hopper 25 reserving a molding material such as a resin or the like, a cylinder 27 storing a molten resin obtained by heating and melting the molding material 150, and a screw 29 feeding the molten resin to the cavity 13 within the cylinder 27.

Next, a description will be given of an injection molding method using the injection molding machine 1 and the metal mold 5 with reference to FIGS. 1 to 3. First, as a preparing step of an injection molding step, there are executed a mold clamping step of moving the movable side die plate 17 close to the stationary side die plate 15 so as to close the core portion 11 (the male mold) and the cavity 13 (the female mold) in the metal mold 5, a nozzle touch step of moving and fixing the nozzles 23 and 24 of the injection units 3 and 4 to a nozzle receiving portion of the stationary side die plate 15, and the like (refer to FIG. 1).

In the state mentioned above, there is executed a first injecting step of injecting the molten resin heated and molten within the cylinder 27 of the first injection unit 3 and having a predetermined temperature into the cavity 13 of the metal mold 5 from the first nozzle 23 via the first gate 21 on the basis of a forward movement of the screw 29. A fluid head portion of a first molten resin 101 (an anteceding molten resin) injected from the first gate 21 flows to a start end side (a left side in the drawing) and a terminal end side (a right side in the drawing) in a longitudinal direction within the cavity 13 step by step, as shown in (a) of FIG. 2. Further, the fluid head portion of the first molten resin 101 first reaches the start end in the longitudinal direction within the cavity 13 so as to finish the charging to the charging start side, and also expands the charging area to the finish end side. In this case, the injection is not executed from the second gate 22 in the first injecting step.

Figure 2:
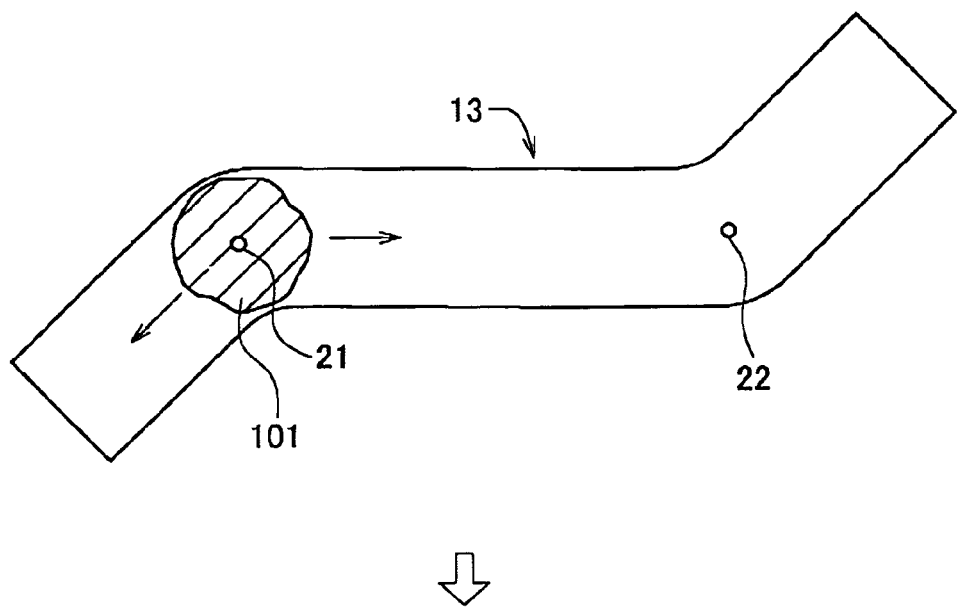
FIG. 2 is a cross sectional view along a line A-A in FIG. 1 explaining an injection molding step in accordance with the present invention.
Figure 2:
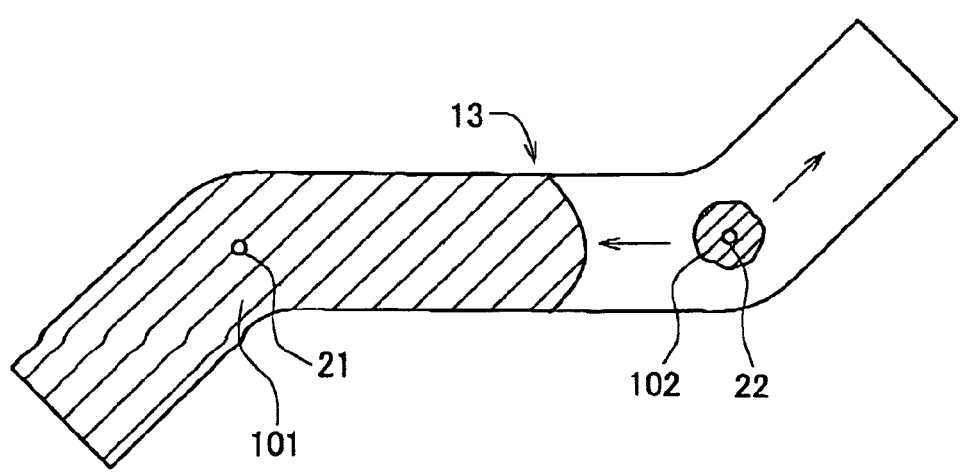

Next, when the flow head portion of the first molten resin 101 reaches a position slightly close to the start end side in the longitudinal direction (close to the first gate 21) rather than a position of the second gate 22, the injection from the first gate 21 is stopped, and a second injecting step of newly injecting the second molten resin 102 (the following molten resin) into the cavity 13 from the second gate 22 is executed ((b) of FIG. 2). Since the second molten resin 102 can be injected without the second gate 22 being closed by the fluid head portion of the first molten resin 101 it is possible to make the injection pressure of the second molten resin 102 (substantially corresponding to an entire injection pressure of the injection molding machine 1) low.

The fluid head portion of the second molten resin 102 flows to the start end side in the longitudinal direction within the cavity 13, and is brought into contact with the fluid head portion of the first molten resin 101. At this time, since both of the fluid head portion of the first molten resin 101 and the fluid head portion of the second molten resin 102 are in the molten state, both the fluid head portions are mixed with each other to such a level that no problem is generated in strengths of the resin materials ((a) of FIG. 3).

Figure 3:
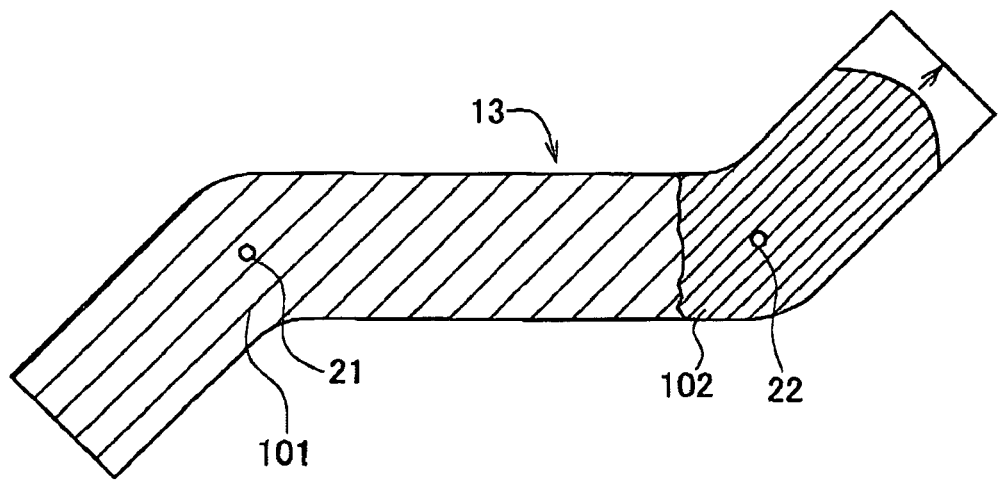
FIG. 3 is an explanatory view following to FIG. 2.
Figure 3:
Figure 3:
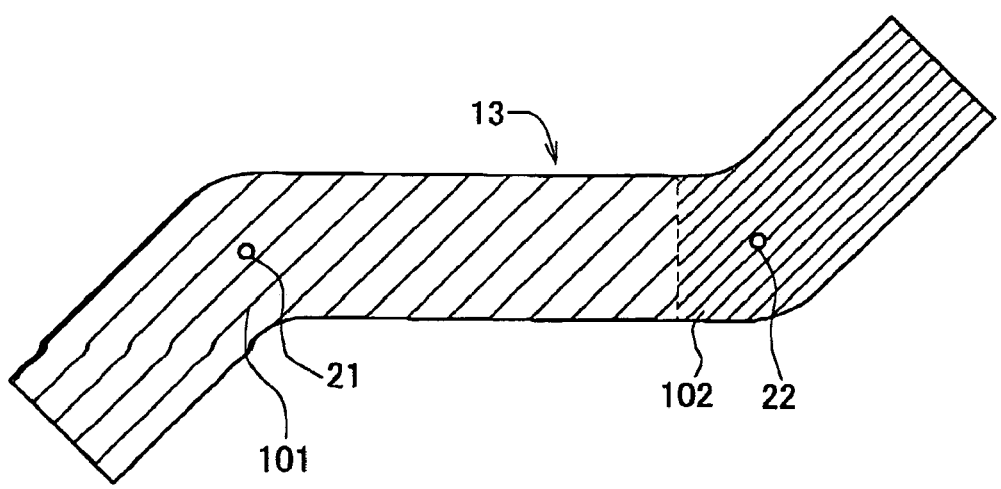

On the other hand, the flow head portion of the second molten resin 102 also flows to the terminal end side in the longitudinal direction within the cavity 13, and when the flow head portion of the second molten resin 102 reaches the terminal end in the charging finish side, the charging from the second gate 22 into the cavity 13 is finished ((b) of FIG. 3). In this case, by the time when the fluid head portion of the second molten resin 102 reaches the terminal end in the charging finish side within the cavity 13, the first molten resin 101 becomes in an approximately cooled and solidified state. Accordingly, the substantial projected area charged by the second molten resin 102 is reduced by the projected area that the first molten resin 101 is already cooled and solidified within the cavity 13, and the injection pressure can be made low in correspondence thereto.

The molded article injection molded within the cavity 13 in the manner mentioned above is taken out from the metal mold 5 (not shown) via a cooling step in which the formed article is further cooled by a cooling water passing within the metal mold 5, a mold opening step in which the metal mold 5 is separated by an operation in a reverse direction to the mold clamping step of the mold clamping unit, an extending step in which the metal mold 5 is extended by an extending mechanism (not shown) and the like.

In this case, when the fluid head portion of the first molten resin 101 reaches a predetermined position in the second injecting step, the injection molding time can be intended to be shorten by stopping the injection from the first gate 21 after a predetermined time has passed from the injection start from the second gate 22. In this case, it is possible to stop the injection from the first gate 21 after a predetermined time has passed, by reducing an injection flow amount from the first gate 21 step by step together with the injection start from the second gate 22.

Further, in the second injecting step, it is possible to determine an injection start timing from the second gate 22 (a position of the fluid head portion of the first molten resin 101 at a time of starting the injection), a cooling and solidifying timing and the like of the first molten resin 101, on the basis of trial, however, may be automatically adjusted, for example, by using a position sensor in the fluid head portion or the like.

Further, in the present embodiment, two injection units 3 and 4 are provided in correspondence to the respective gates 21 and 22, however, the structure may be made such that a common injection unit and a common sprue are branched into two injection paths by a runner so as to be connected to the respective gates 21 and 22. In this case, the injection may be started and stopped by opening and closing gate valves provided in the respective gates 21 and 22.

In this case, in the present invention, the first molten resin 101 and the second molten resin 102 may be different, for example, in view of a color and/or a material, in addition to the same structure in view of the color and the material. Further, the present invention may be applied to the case that the number of the gates is three or more.

Figure 4:
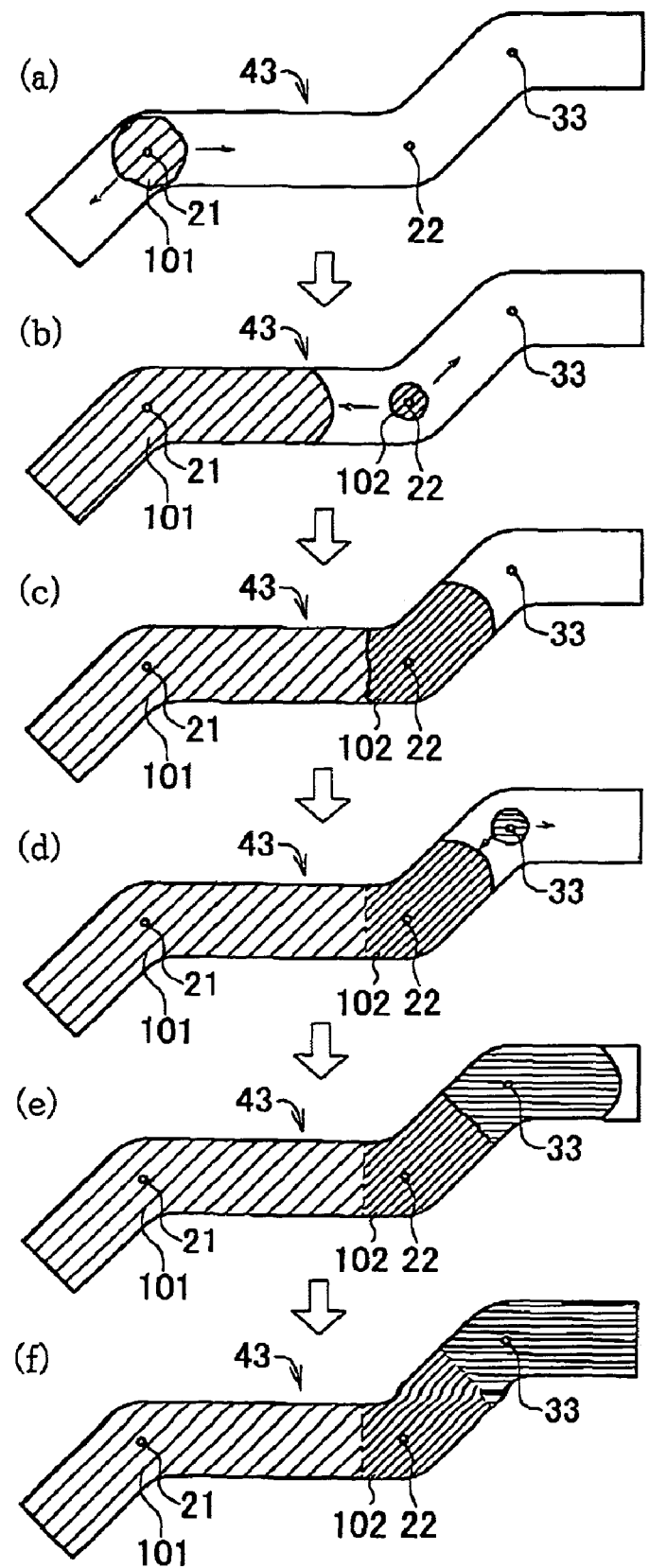
FIG. 4 is a view showing another embodiment of metal mold corresponding to FIGS. 2 and 3.

Further, FIG. 4 shows another embodiment of injection molding method according to this invention. In this case, the cavity 43 of the metal mold have three or more gates, that is the first gate 21, the second gate 22 and the third gate 23. First molten resin is supplied into the cavity 43 from the gate 21. After that, next molten resin is supplied into the cavity 43 from the gate 22, and then last molten resin is injected into the cavity 43 from the gate 33 so that remain cavity is finally filled with the last molten resin from the third gate 33.

Figure 5:
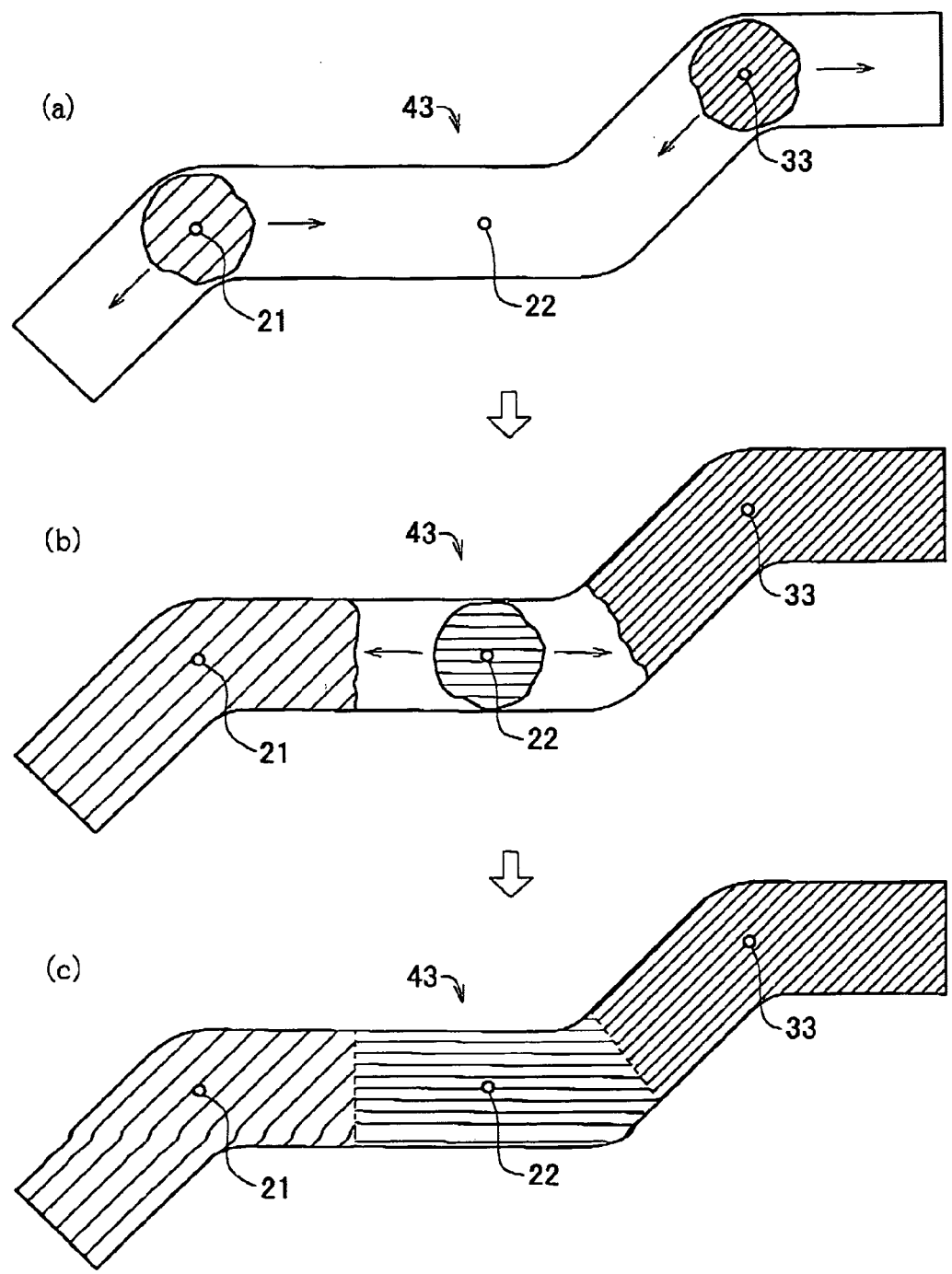
FIG. 5 is a view showing another embodiment of the injection molding method.

Furthermore, FIG. 5 shows other embodiment of the injection molding method. The cavity 43 of the metal mold have three or more gates 21, 22 and 33. In this case, first molten resin is supplied into the cavity 43 from the gate 21 and 33 approximately same time, except the area of the middle gate 22. Next, middle (central) area of the cavity 43, that is area of the gate 22 is filled with the last molten resin injected from the gate 22.

Figure 6:
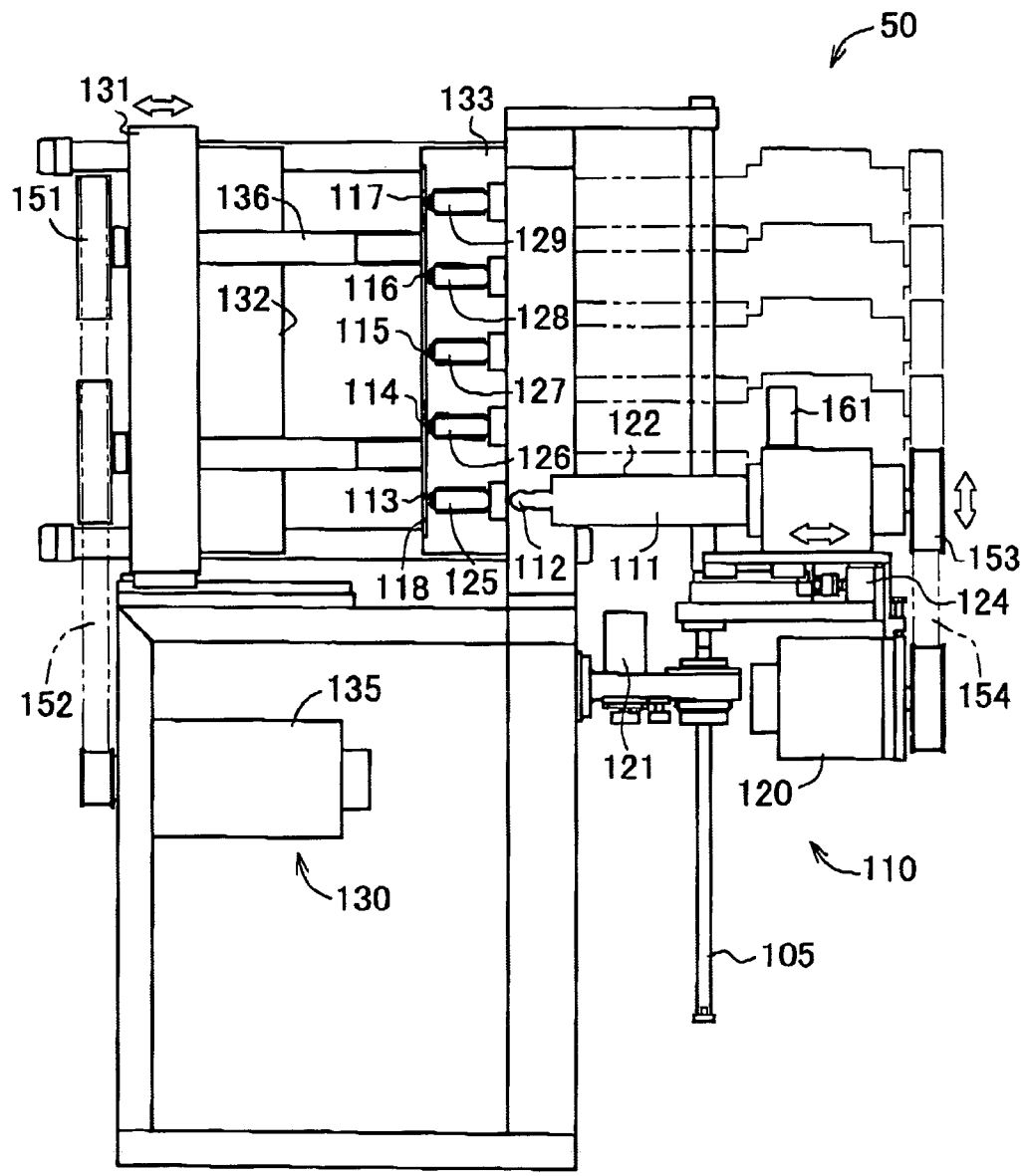
FIG. 6 is a front elevational view showing an embodiment of an injection molding apparatus in accordance with the present invention.
Figure 7:
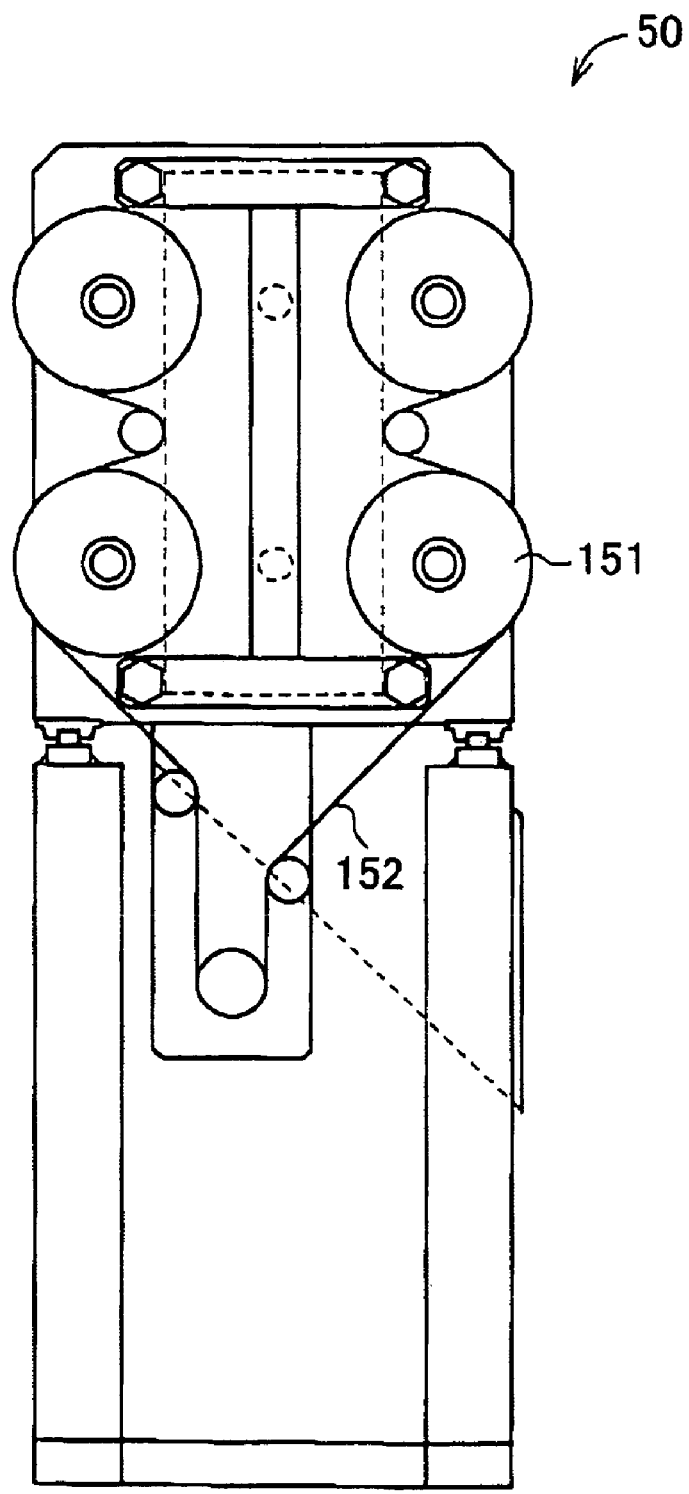
FIG. 7 is a side elevational view showing the embodiment of the injection molding apparatus in accordance with the present invention.

Next, FIG. 6 is a front elevational view of an injection molding machine 50 corresponding to an embodiment in accordance with the present invention. FIG. 7 is a side elevational view showing the injection molding machine 50. The injection molding machine 50 is structured such as to manufacture a molded article such as a resin part for a motor vehicle (for example, an elongated part such as a protector for preventing wind around a fender of the motor vehicle from making an intrusion).

The injection molding machine 50 includes an elongated cavity 118 formed in a metal mold for an injection molding, a plurality of resin supplying ports 113, 114, 115, 116 and 117 for injecting a resin and arranged in a longitudinal direction of the cavity, a injection portion moving bar 105 serving as an injection portion moving guide along which an injection portion placed in a direction of arrangement of the resin supplying ports moves, and the injection portion 110 moving along the injection portion moving bar. Further, the injection molding machine 50 is also provided with an opening and closing mechanism 130 for opening and closing the metal mold and clamping the metal mold by a high pressure so as to fix.

The injection portion 110 includes an extrusion and injection screw 111 corresponding to an injection mechanism for injecting the molten resin into the cavity 118, an air cylinder 124 corresponding to an injection mechanism driving apparatus for moving the extrusion and injection screw 111 in a lateral direction (a vertical direction to the longitudinal direction of the cavity), and an extrusion and injection motor 120 for rotating the extrusion and injection screw.

The injection portion 110 is integrally moved in a vertical direction by an elevating motor 121. This movement is carried out along a longitudinal direction of the cavity 118, and the extrusion and injection screw 111 is moved above the resin supplying ports 113, 114, 115, 116 and 117 provided in the cavity 118. Further, the extrusion and injection screw 111 moved above the resin supplying ports 113, 114, 115, 116 and 117 is moved in a back and forth direction (a vertical direction to the longitudinal direction of the cavity 118) by the air cylinder 124, and a nozzle 112 in a leading end of the extrusion and injection screw 111 can be brought into contact (nozzle touch) with the resin supplying ports 113, 114, 115, 116 and 117 provided in the cavity 118.

The elongated cavity 118 is provided with a plurality of resin supplying ports 113, 114, 115, 116 and 117, a longitudinal direction of the elongated cavity 118 is set as a vertical direction, a lower end and an upper end of the cavity 118 are respectively set to a start end and a finish end, an entire of the cavity 118 is filled by the molten resin by sequentially injecting the molten resin from the resin supplying port 113 in the start end side to the resin supplying port 117 in the terminal end side, whereby the molded article is manufactured. The cavity 118 can be filled by the molten resin with no gap by starting charging the molten resin from the first resin supplying port 113 in the lower end of the cavity 118 due to its own weight of the molten resin, without applying so much injection pressure.

In the injection molding machine 50, a material to be molded introduced from a hopper 161 drops within a heating cylinder 122 due to its own weight, and is molten by a heater while being mixed by the extrusion and injection screw 111 in the heating cylinder 122. The extrusion and injection screw 111 is rotated by transmitting a rotation of the extrusion and injection motor 120 placed in the injection portion 110 to a pulley 153 through a timing belt 154. The molten resin reaching the nozzle 112 in the front end of the extrusion and injection screw 111 on the basis of the rotation of the extrusion and intrusion screw 111 is injected into the cavity 118 from the resin supplying ports 113, 114, 115, 116 and 117 of the cavity 118 by the nozzle 112 in the leading end of the injection screw 111. In this case, the timing belt 154 and the pulley 153 are provided in an outer side of the extrusion and injection screw 111 and the extrusion and injection motor 120.

The injection portion 110 is moved to the first resin supplying port 113 by the elevating motor 121, the leading end of the extrusion and injection screw 111 is brought into contact with the first resin supplying port 113 by the air cylinder 124, and the molten resin is injected into the cavity 118 from the first resin supplying port 113. A detection sensor is provided at a predetermined position of the cavity 118, and a charging amount can be detected by the detection sensor. The injection is stopped at a time when the sensor detects the resin, and the leading end nozzle 112 of the extrusion and injection screw 111 vertically moves apart from the first resin supplying port 113 by the air cylinder 124 in the longitudinal direction of the cavity 118. At this time, the molten resin before being solidified within the cavity 118 is prevented from flowing out by a hot runner 125 with a shutoff function. Thereafter, an entire of the injection portion 110 is moved along the longitudinal direction of the cavity 118 by the elevating motor 121, is stopped above the second resin supplying port 114, and is vertically moved in the longitudinal direction of the cavity 118 until the leading end nozzle 112 of the extrusion and injection screw 111 is brought into contact (nozzle touch) with the second resin supplying port 114 by the air cylinder 124. Thereafter, the molten resin is injected into the cavity 118 from the second resin supplying port 114 in the same manner as that of the injection performed in the first resin supplying port 113. The charging amount in this case is detected by the detection sensor, and the injection is finished. Thereafter, the resin is injected in the third resin supplying port 115, the fourth resin supplying port 116 and the fifth resin supplying port 117 in the same manner, sequentially, whereby an entire of the cavity 118 is filled by the molten resin.

Just after the leading end nozzle 112 of the extrusion and injection screw 111 moves apart from the resin supplying port, the resin within the cavity 118 is not yet solidified, however, is prevented from flowing out by the hot runners with shutoff function 125, 126, 127, 128 and 129. By the time when the molten resin injected from the final resin supplying port 117 reaches the terminal end in the charging finish side, the molten resin charged before then becomes in an approximately cooled and solidified state. Accordingly, a substantial projected area charged from the final resin supplying port 117 just before the charging finish is reduced only by a projected area of a portion which has been charged before then and has been already cooled and solidified within the cavity 118, and an injection pressure is lowered in correspondence thereto. As a result, it is possible to lower the mold clamping force, and it is possible to reduce a cost of equipment and a manufacturing cost.

The opening and closing mechanism 130 is provided with a movable plate 131 arranged in one end of the injection molding machine 50. An opening and closing side tie bar 136 is inserted to a quadrangular corner in the movable plate 131. A pulley 151 is mounted to an end of the opening and closing side tie bar 136 in an opposite direction to a stationary metal mold 133, and the movable plate 131 is moved in an axial direction of the opening and closing side tie bar 136 by transmitting the rotation of a mold moving motor 135 to the pulley 151 by a timing belt 152.

A movable metal mold 132 is assembled in the movable plate 131. The movable metal mold 132 is moved together with the movable plate 131, and the structure is made such that a mold clamping between the movable metal mold 132 and the stationary metal mold 133 is achieved by moving them close to each other, and a mold opening therebetween is achieved by moving them apart from each other. Further, after the molded article injected and molded within the cavity 118 is cooled and solidified by a cooling water circulating within the metal mold, the molded article is pushed out by a push-out mechanism or the like, and is taken out from the metal mold.

Figure 8:
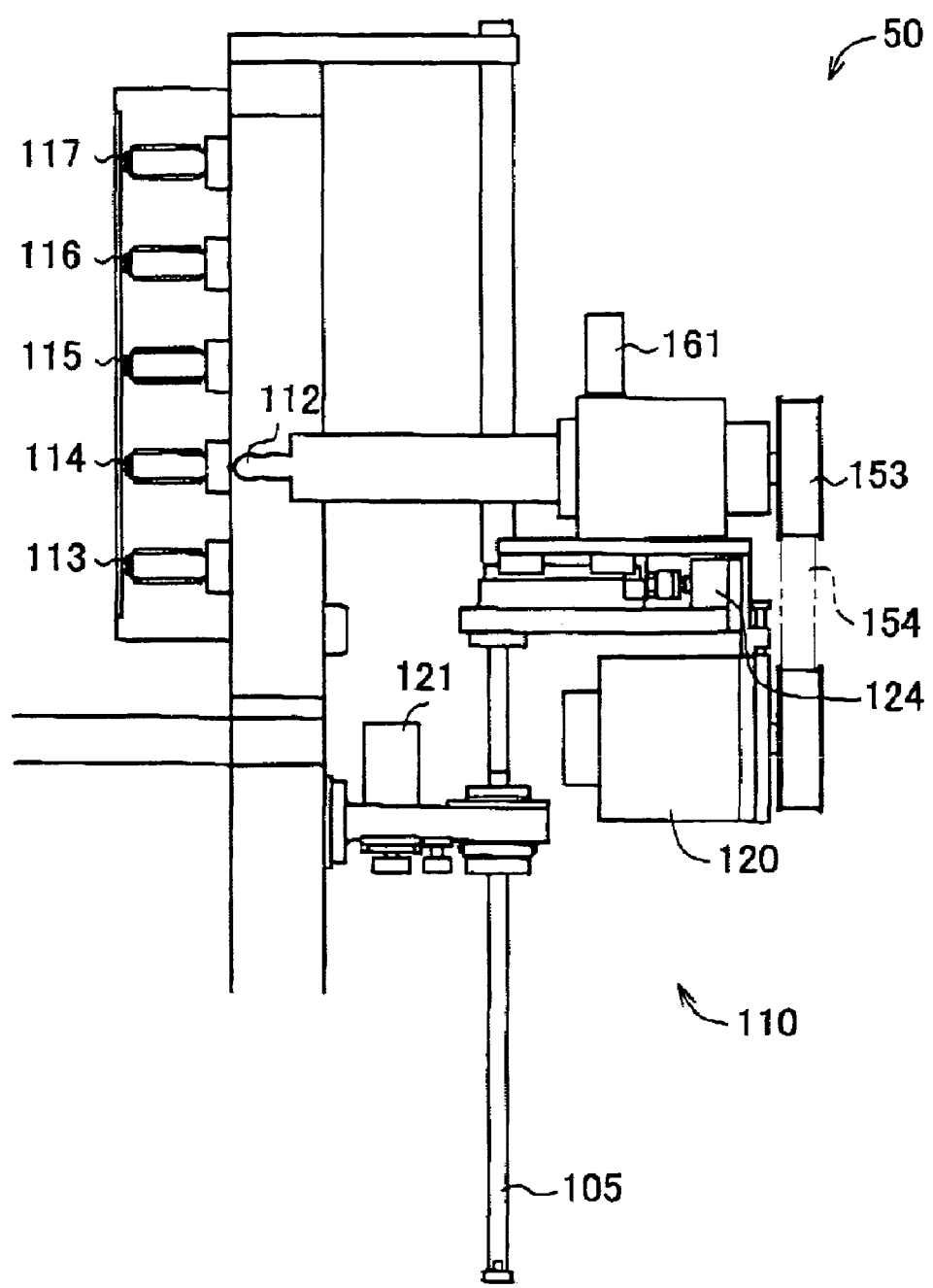
FIG. 8 is an explanatory view showing a nozzle touch with a second resin supplying port in the injection molding apparatus in FIG. 6.

FIG. 8 shows a state in which the injection portion 110 moves along the injection portion moving bar 105 to the above of the second resin supplying port 114, and the leading end nozzle 112 of the extrusion and injection screw is brought into contact (nozzle touch) with the second resin supplying port 114. After the leading end nozzle 112 is brought into contact with the second resin supplying port 114 in the manner mentioned above, the molten resin is injected into the cavity 118. The molten resin is injected in the same manner by the movement of the injection portion 110, with respect to the other resin supplying ports.

Figure 9:
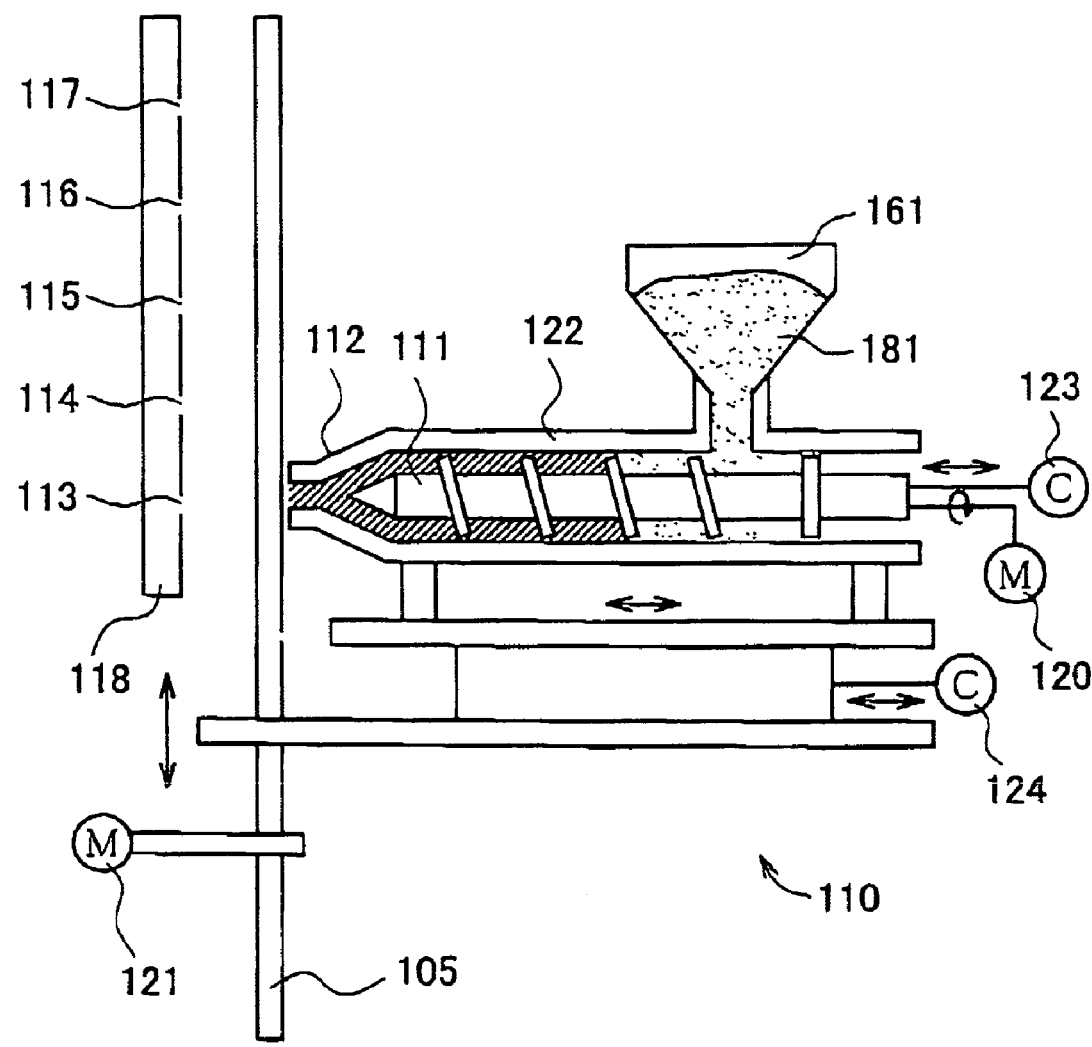
FIG. 9 is an explanatory view of driving of an injection portion.

FIG. 9 is a schematic view explaining driving of the injection portion. The injection molding apparatus is provided with the elevating motor 121 corresponding to the injection portion driving apparatus, the air cylinder 124 for moving the heating cylinder 122, the hopper 161 and the like back and forth corresponding to the injection mechanism, the extrusion and injection motor 120 for rotating the extrusion and injection screw 111, and a cylinder 123 for moving the extrusion and injection screw 111 back and forth and injecting the resin.

First, the injection portion 110 is integrally moved vertically by the elevating motor 121 corresponding to the injection portion driving apparatus. Next, the heating cylinder 122 and the hopper 161 corresponding to the injection mechanism are integrally moved back and forth by the air cylinder 124. Accordingly, the leading end nozzle 112 is brought into contact with, for example, the first resin supplying port 113. A resin 181 received in the hopper 161 drops within the heating cylinder 122, and the extrusion and injection screw 111 rotated by the extrusion and injection motor 120 carries the resin 181 molten within the heating cylinder 122 to the leading end nozzle 112. Further, the resin 181 carried to the leading end is injected to the cavity 118 from the resin supplying port by the cylinder 123. In this case, the cylinder 123 may be omitted, and the resin may be injected by the rotation of the extrusion and injection screw 111. On the basis of the driving mentioned above, the leading end nozzle 112 moves to each of the resin supplying ports 113, 114, 115, 116 and 117 and can be brought into contact therewith. Further, the resin 181 can be injected to the cavity 118 from each of the resin supplying ports 113, 114, 115, 116 and 117.

Figure 10:
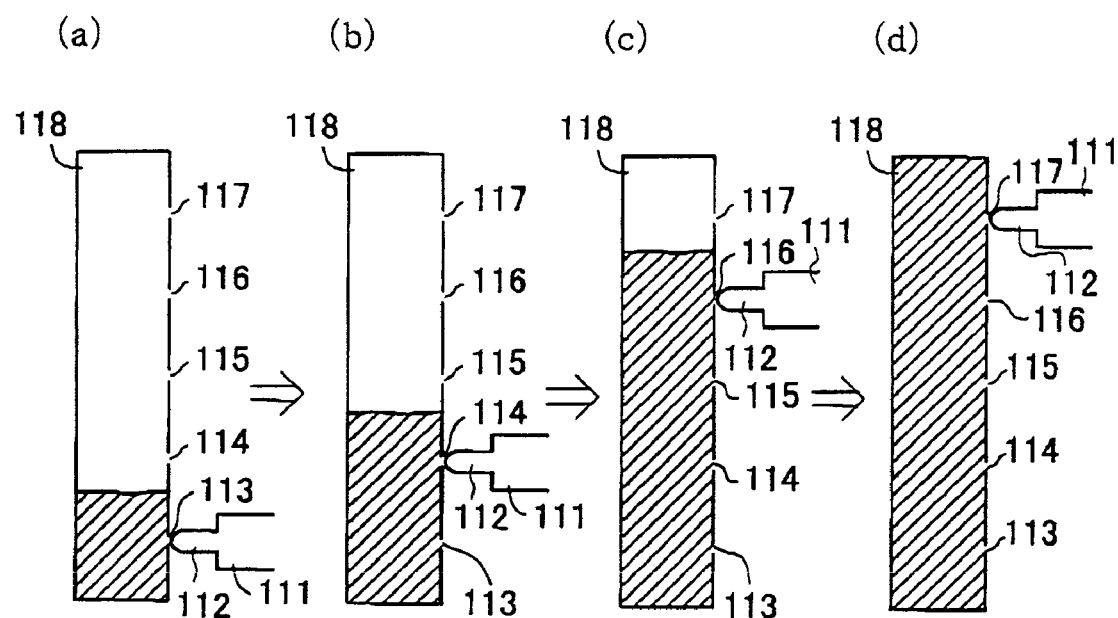
FIG. 10 is an explanatory view showing a divided injection step by a relay molding.

FIG. 10 shows a state in which the elongated product is injected in a divisional manner in accordance with a relay molding in which the injection portion is moved. (a) of FIG. 10 shows a state in which the resin is injected from the first resin supplying port 113. This is the state in which the leading end nozzle 112 of the extrusion and injection screw 111 is brought into contact with the resin supplying port 113 existing in the lowermost end of the cavity 118 and the resin is supplied to the cavity 118. The molten resin injected to the cavity 118 is charged from the lower end of the cavity 118 due to its own weight. The injection is stopped by the detection of the detection sensor provided at the predetermined position of the cavity 118 so as to prevent the supplied resin from flowing out from the second resin supplying port 114, and the extrusion and injection screw 111 is moved apart from the first resin supplying port 113, is moved upward, is brought into contact with the second resin supplying port 114, and starts injecting (b) of FIG. 10 shows a state in which the resin is subsequently injected from the second resin supplying port 114. The resin injected from the second resin supplying port 114 fills over the resin injected from the first resin supplying port 113. The resin injected from the first resin supplying port 113 is solidified by this time. The solidified resin injected from the first resin supplying port 113 is molten a little by the high temperature resin injected from the second resin supplying port 114, and is mixed with the hot resin so as to be bonded. Thereafter, the resin is injected in the same manner from the third resin supplying port 115 and the fourth resin supplying port 116. (c) of FIG. 10 shows a state in which the resin is injected from the fourth resin supplying port 116. As shown in (d) of FIG. 10, the resin is injected into the cavity 118 from the fifth resin supplying port 117 in the uppermost end, and the charging is finished.

In accordance with the method mentioned above, it is possible to manufacture the elongated resin product by the mold clamping force of about 10 tons in the present machine, the mold clamping force between about 300 tons and 350 tons being conventionally required for the elongated resin product having the length of some tens cm. In this case, FIGS. 6, 8, 9 and 10 show the embodiment in which the first to fifth resin supplying ports are placed, however, the number of the resin supplying ports is not limited to this case. Conventionally, the longer the article is, the greater the mold clamping force is required to be set, so that there is a defect that the apparatus is large in scale. However, in the present machine, even in the case that the particularly long product is manufactured, the product can be manufactured by the same mold clamping force of about 10 tons as mentioned above by increasing the number of the resin supplying ports. Further, the injection pressures in the stages are the same anyplace and about 600 $kg/cm^2$. Since the injection pressure is conventionally about 1000 to 1200 or about 1500 $kg/cm^2$, the injection pressure is lowered. In some shapes of the products, the injection pressure can be further lowered in the present machine.

As the guide of the movable injection portion, there is shown the case of the bar (the injection portion moving bar 105), however, the guide is not limited to the bar, and the other shapes may be employed. Further, it is not necessary that the cavity is formed in a linear shape, and the cavity may be formed in a shape including a curve or the like. In this case, a plurality of resin supplying ports are provided, and the injection portion is moved to each of the resin supplying ports so as to inject the resin. Further, the injection portion is moved along the resin supplying ports provided in the cavity, however, the moving direction is not limited to the vertical direction, and the injection portion may be structured such as to be moved in a horizontal direction or an oblique direction.

Figure 11:
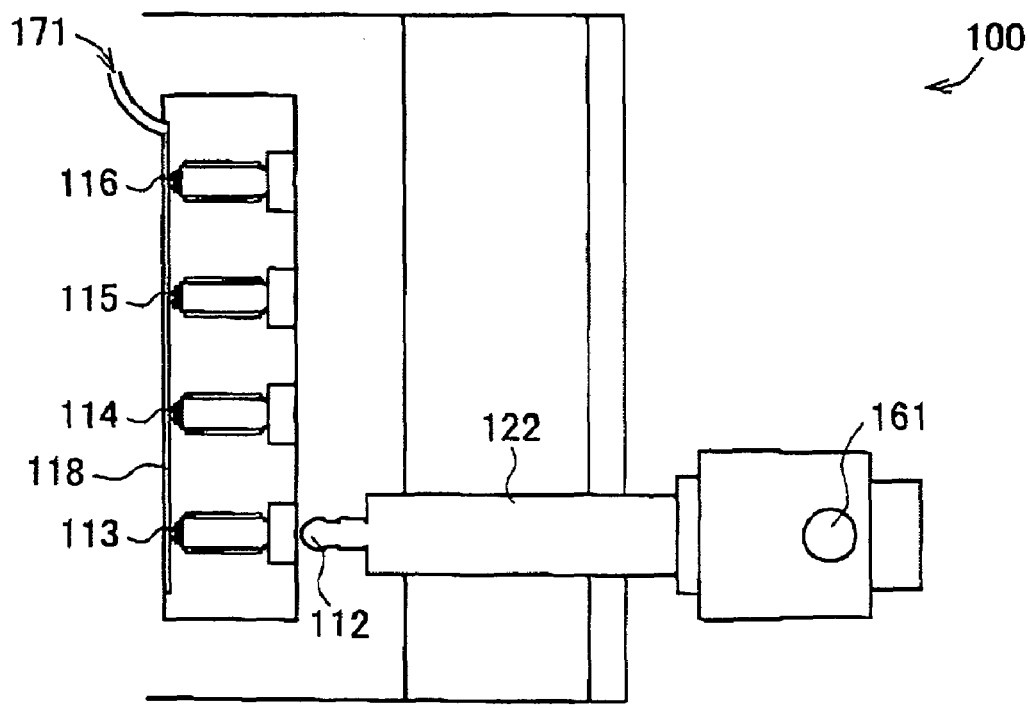
FIG. 11 is a view showing an embodiment 2 in which the injection portion moves horizontally.

As a second embodiment, an injection molding machine 100 in the case that the longitudinal direction of the cavity 118 is set to a horizontal direction is shown in FIG. 11. FIG. 11 is a view of the injection molding machine 100 as seen from an upper portion thereof. The injection portion is moved along the longitudinal direction of the cavity 118, that is, a horizontal direction. In this case, the injection is started from the first resin supplying port 113 which is arranged in one end of the cavity 118, and the cavity 118 is pressurized by a gas 171. The injected molten resin is pushed into one end of the cavity by this pressurizing, and the cavity 118 can be filled by the molten resin with no gap. After finishing the injection from the first resin supplying port 113, the injection from the second resin supplying port 114 is started while being continuously pressurized by the gas 171. After a predetermined amount of molten resin is charged from the second resin supplying port 114, the resin is continuously injected from the third resin supplying port 115 and the resin is injected from the adjacent resin supplying ports, sequentially. Before the injection is started from the final resin supplying port 116, the pressurizing by the gas 171 is finished, the resin is injected from the final resin supplying port, and the charging within the cavity 118 is finished. The other matters such as the introducing method of the material to be molded and the opening and closing mechanism 130 are the same as those of the first embodiment.

The aspect of pressurizing by the gas is not limited to the case that the longitudinal direction of the cavity is the horizontal direction. The pressurization by the gas can be also applied to the case that the longitudinal direction of the cavity is the vertical direction. The resin can be charged into the cavity without forming any gap on the basis of the pressurization by the gas.

Figure 12:
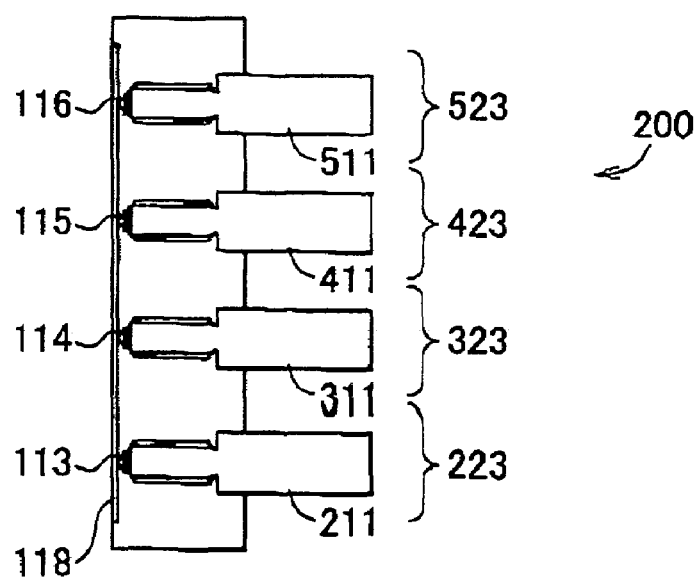
FIG. 12 is a view showing an embodiment 3 in which a plurality of stationary injection portions are provided.

Further, as a third embodiment, FIG. 12 shows an injection molding machine 200 in which a plurality of resin supplying ports 113, 114, 115 and 116 are provided in the cavity 118, and stationary injection portions 223, 323, 423 and 523 of the same number are placed. Extrusion and injection screws 211, 311, 411 and 511 are respectively placed in the injection portions 223, 323, 423 and 523. The longitudinal direction of the cavity 118 is set to the vertical direction, and the molten resin is injected to the lowermost resin supplying port 113 from the first injection portion 223 placed in the lowermost end. After the injection from the first injection portion 223 is finished, the resin is injected from the second injection portion 323 placed in the upper portion of the first injection portion 223. Thereafter, the injection from the third injection portion 423 in the upper portion of the second injection portion 323 is started. Thereafter, the injection is started from the injection portion in the upper portion sequentially, and the charging of the molten resin into the cavity 118 is finished by injecting the resin from the final injection portion 523 placed in the uppermost portion.

Since the resin injection is started from the lower end resin supplying port, the molten resin is charged from the lower end of the cavity by its own weight, and can fill up the cavity with no gap. In accordance with this method, since it is necessary that a plurality of injection portions are placed, the apparatus becomes large-scaled, however, since a time loss caused by the movement of the injection portion is reduced in comparison with the embodiment mentioned above, it is possible to reduce the manufacturing cost. The other matters such as the introducing method of the material to be molded and the opening and closing mechanism are the same as those of the first embodiment.

The resin can be injected in a divisional manner by providing a plurality of resin supplying ports in the elongated cavity in the manner mentioned above. Accordingly, it is possible to intend to lower the mold clamping force in view of both of the projected area of the molded article and the injection pressure, and it is possible to intend to reduce the cost of equipment and the manufacturing cost.

What is claimed is:

1. A low pressure injection molding method for forming an elongated molded article in a vertically disposed single mold cavity having a plurality of vertically disposed resin supplying ports, said method comprising the following steps:

(a) moving an injector portion so that it contacts a low vertically disposed resin supplying port in communication with a single mold cavity for the elongated article to be formed, (b) injecting at low pressure molten resin from the injection portion into the vertically disposed mold, (c) then moving the injector portion away from the low vertically disposed resin supplying port, and then vertically moving the injector portion to contact a next higher resin supplying port in the mold cavity, and (d) injecting at low pressure molten resin from the injection portion into the vertically disposed mold, and repeating steps (c) and (d) above until the mold cavity is filled with resin.

2. The low pressure injection molding method of claim 1, wherein, during injection of the molten resin into the cavity, said injection portion moves from a vertically disposed resin supplying port disposed at a lowest elevation end of the line of a plurality of vertically disposed resin supplying ports, to a vertically disposed resin supplying port disposed at an upper elevation end of the plurality of vertically disposed resin supplying ports.

3. The low pressure injection molding method of claim 1, further comprising: detecting an amount of molten resin charged into the single mold cavity by means of a detection sensor in communication with the injection portion, terminating the injection of said molten resin from said injection portion to one vertically disposed resin supplying port by means of the a detection sensor disposed in a predetermined position of said single mold cavity, and upon termination of injection of the molten resin at the one vertically disposed resin supplying port, moving said injection portion to a next higher vertically disposed resin supplying port in the line of the plurality of vertically disposed resin supplying ports.

* * * * *